(12) United States Patent
Zhang et al.

(10) Patent No.: US 11,505,704 B2
(45) Date of Patent: Nov. 22, 2022

(54) AEROSOL PRIMER COMPOSITION AND METHOD OF USE

(71) Applicant: PLZ Aeroscience Corporation, Downers Grove, IL (US)

(72) Inventors: Peter Q. Zhang, Toronto (CA); Howard E. Matthews, Toronto (CA); Tejas R. Patel, Toronto (CA); Christian P. Akow, Toronto (CA)

(73) Assignee: PLZ Corp., Downers Grove, IL (US)

( * ) Notice: Subject to any disclaimer, the term of this patent is extended or adjusted under 35 U.S.C. 154(b) by 288 days.

(21) Appl. No.: 16/862,642

(22) Filed: Apr. 30, 2020

(65) Prior Publication Data

US 2020/0347237 A1 Nov. 5, 2020

Related U.S. Application Data

(60) Provisional application No. 62/843,003, filed on May 3, 2019.

(51) Int. Cl.
| | |
|---|---|
| *C09D 5/02* | (2006.01) |
| *C09D 5/00* | (2006.01) |
| *C09D 175/04* | (2006.01) |
| *B65D 83/14* | (2006.01) |
| *C09D 7/20* | (2018.01) |
| *C09D 15/00* | (2006.01) |
| *B05D 1/02* | (2006.01) |
| *C09D 7/65* | (2018.01) |
| *C09D 7/40* | (2018.01) |

(52) U.S. Cl.
CPC ............... *C09D 5/021* (2013.01); *B05D 1/02* (2013.01); *B65D 83/752* (2013.01); *C09D 5/002* (2013.01); *C09D 7/20* (2018.01); *C09D 7/65* (2018.01); *C09D 7/69* (2018.01); *C09D 15/00* (2013.01); *C09D 175/04* (2013.01)

(58) Field of Classification Search
CPC ........................................................ C09D 7/69
See application file for complete search history.

(56) References Cited

U.S. PATENT DOCUMENTS

| | | | |
|---|---|---|---|
| 7,717,996 B2 | 5/2010 | Bumm et al. | |
| 9,388,325 B2 | 7/2016 | Jones et al. | |
| 9,932,496 B2 | 4/2018 | Boest | |
| 2015/0225610 A1* | 8/2015 | Boest | C09D 5/28 428/326 |
| 2019/0016917 A1 | 1/2019 | Swarup et al. | |

FOREIGN PATENT DOCUMENTS

| | | | |
|---|---|---|---|
| CN | 101734094 B | 2/2012 | |
| CN | 103820010 B | 5/2016 | |
| EP | 0792923 | 9/1997 | |
| WO | WO-2018162801 A1 * | 9/2018 | ............ B65D 83/14 |

* cited by examiner

*Primary Examiner* — Christopher M Rodd
(74) *Attorney, Agent, or Firm* — Price Heneveld LLP

(57) ABSTRACT

An aerosol primer composition includes a film forming component and a propellant component. The film forming component includes (by weight of the composition): (a) at least one of a polyurethane and alkyd from about 10% to about 20%, (b) cellulosic particles from about 2% to about 5%, and (c) an aqueous solvent system from about 20% to about 40%. The propellant component includes dimethyl ether. The aerosol primer composition can be stored within a spray assembly and the propellant component can be configured to pressurize the film forming component for dispensing from the spray assembly as an aerosol. The aerosol primer composition can be used to prime a substrate to be painted or stained.

20 Claims, 2 Drawing Sheets ered by paint and forces the paint out through the spray outlet. When the propellant is a liquefied gas, as the paint and propellant are dispensed as a single liquid phase, the turbulence created in the channels of the actuator causes the atomization of the paint.

AEROSOL PRIMER COMPOSITION AND METHOD OF USE

CROSS-REFERENCE TO RELATED APPLICATION

This application claims priority to and the benefit under 35 U.S.C. § 119(e) of U.S. Provisional Patent Application No. 62/843,003 filed on May 3, 2019, entitled AEROSOL PRIMER COMPOSITION AND METHOD OF USE, the entire disclosure of which is hereby incorporated herein by reference.

FIELD OF THE DISCLOSURE

The present disclosure generally relates to an aerosol primer composition for priming a surface of a substrate to be painted or stained. More specifically, the present disclosure relates to an aerosol primer composition including cellulosic particles that can be used to provide a patterned surface that can be painted or stained.

BACKGROUND

The use of an aerosol spray to apply a coating product, such as a primer, paint, or wood stain, has several advantages compared to the traditional liquid formulations of these types of products. Aerosol sprays allow the product to be applied as a mist without the use of brushes or other applicators, which can be costly and time consuming to clean and maintain. In addition, it can often be easier to apply the product in areas with restricted access or complicated geometries using an aerosol mist compared to other applicators, such as brushes or rollers. Further, aerosol sprays can often be easier for non-experts to use to apply a uniform coating to a surface compared to a liquid product.

Aerosol sprays are generally prepared by combining a desired coating composition, such as a paint, for example, with a propellant in a container that is sealed under high pressure (greater than ambient). The propellant can be a liquefied gas or a compressed gas. The container typically includes a valve that is fluidly coupled with the contents of the container and a spray outlet for dispensing the paint as an aerosol spray. When the valve is actuated, the propellant exerts pressure on the paint and forces the paint out through the spray outlet. When the propellant is a liquefied gas, as the paint and propellant are dispensed as a single liquid phase, the turbulence created in the channels of the actuator causes the atomization of the paint.

It can be challenging to formulate compositions for dispensing as an aerosol. In some cases, combining a coating composition with a propellant under high pressure can result in phase separation and/or coagulation of the components. Phase separation and coagulation can result in incomplete atomization of the coating composition during dispensing, which may produce an inconsistent aerosol spray and/or the formation of large droplets which can negatively affect the uniformity of the applied coating composition. In addition, aggregation can result in clogging of the components of the dispensing system (e.g., valve, dip tube, spray outlet), which may result in inconsistent dispensing or a complete inhibition of dispensing due to clogging of the dispensing system.

As such, there is a need to address challenges relating to formulating a primer composition as an aerosol for priming a surface of a substrate to be painted or stained.

SUMMARY

According to an aspect of the present disclosure, an aerosol primer composition includes a film forming component and a propellant component. The film forming component includes (by weight of the composition): (a) at least one of a polyurethane and alkyd from about 10% to about 20%, (b) cellulosic particles from about 2% to about 5%, and (c) an aqueous solvent system from about 20% to about 40%. The propellant component includes dimethyl ether.

According to an aspect of the present disclosure, a method of priming a substrate to be painted or stained includes dispensing a primer composition onto a surface of the substrate from a pressurized container. The primer composition includes a film forming component and a propellant component. The film forming component includes (by weight of the composition): (a) at least one of a polyurethane and alkyd from about 10% to about 20%, (b) cellulosic particles from about 2% to about 5%, and (c) an aqueous solvent system from about 20% to about 40%. The propellant component includes dimethyl ether. The dispensing is conducted such that the propellant evaporates as the primer composition is dispensed from the pressurized container and the film forming component defines a coating on the surface of the substrate.

According to an aspect of the present disclosure, a spray assembly for an aerosol primer composition includes a container defining a chamber configured to hold the primer composition at a pressure above ambient pressure and a dispensing spray outlet fluidly coupled with the chamber for dispensing the primer composition from the chamber. The primer composition includes a film forming component and a propellant component. The film forming component includes (by weight of the composition): (a) at least one of a polyurethane and alkyd from about 10% to about 20%, (b) cellulosic particles from about 2% to about 5%, and (c) an aqueous solvent system from about 20% to about 40%. The propellant component includes dimethyl ether. The propellant component comprises a propellant selected to pressurize the film forming component within the chamber.

Additional features and advantages will be set forth in the detailed description which follows, and in part will be readily apparent to those skilled in the art from that description or recognized by practicing the embodiments as described herein, including the detailed description as well as the claims. It is to be understood that both the foregoing general description and the following detailed description are merely exemplary, and are intended to provide an overview or framework to understanding the nature and character of the claims.

DETAILED DESCRIPTION

Figure 1:
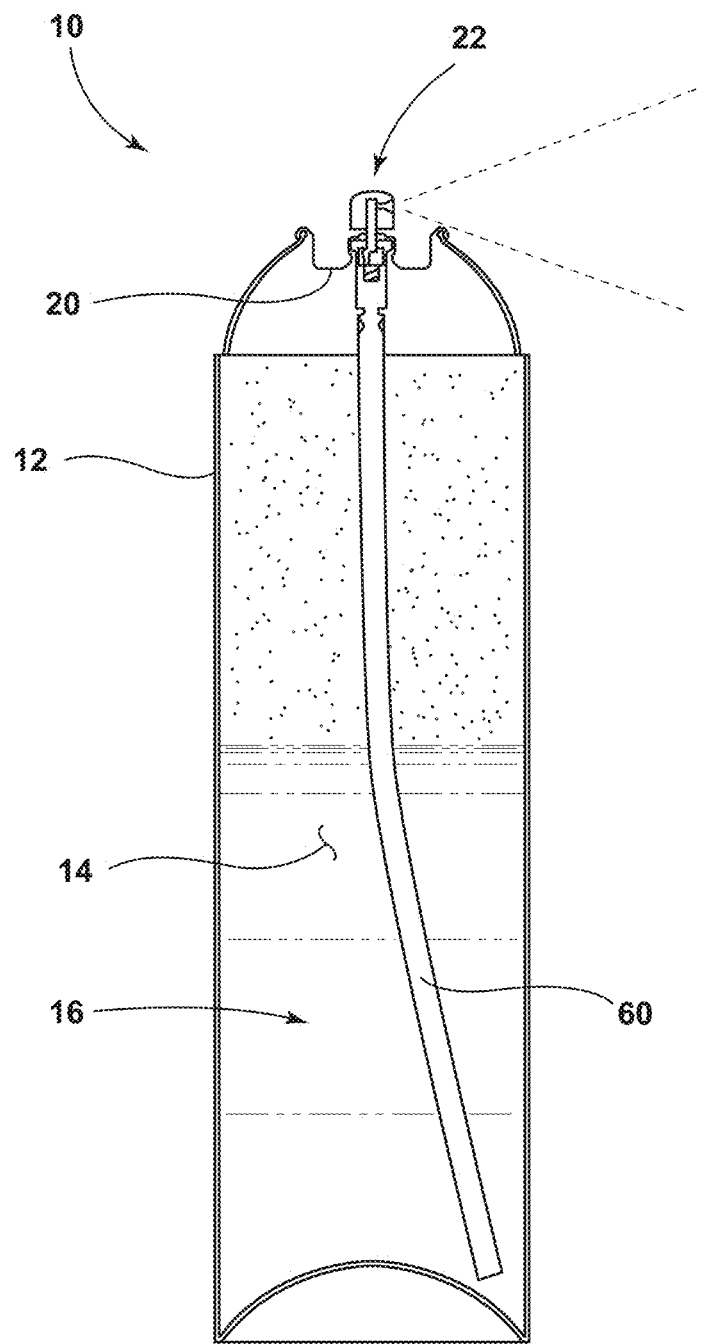
FIG. 1 is a cross-sectional view of an aerosol spray assembly, according to an aspect of the present disclosure.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The term "formed from" can mean one or more of comprises, consists essentially of, or consists of. For example, a component that is formed from a particular material can comprise the particular material, consist essentially of the particular material, or consist of the particular material.

Modifications of the disclosure will occur to those skilled in the art and to those who make or use the concepts disclosed herein. Therefore, it is understood that the embodiments described above are merely for illustrative purposes and not intended to limit the scope of the disclosure, which is defined by the following claims as interpreted according to the principles of patent law, including the doctrine of equivalents.

It will be understood by one having ordinary skill in the art that construction of the described concepts, and other components, is not limited to any specific material. Other exemplary embodiments of the concepts disclosed herein may be formed from a wide variety of materials, unless described otherwise herein.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature, or may be removable or releasable in nature, unless otherwise stated.

It is also important to note that the construction and arrangement of the elements of the disclosure, as shown in the exemplary embodiments, is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures and/or members or connector or other elements of the system may be varied, and the nature or numeral of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes, or steps within described processes, may be combined with other disclosed processes or steps to form structures within the scope of the present disclosure. The exemplary structures and processes disclosed herein are for illustrative purposes and are not to be construed as limiting.

The present embodiments reside primarily in combinations of method steps and apparatus components relating to an aerosol primer composition for priming a surface to be stained or painted.

Aspects of the present disclosure relate to an aerosol primer composition that includes a film forming component and a propellant component including dimethyl ether to aerosolize the film forming component. The film forming component includes: (a) a polyurethane and/or alkyd, (b) cellulosic particles, and (c) an aqueous solvent system. The film forming component can be applied to the surface of a substrate to form a coating that can be painted or stained. The cellulosic particles in the coating formed by the film forming component can be patterned after the film forming component is applied onto a surface of a substrate to provide the substrate with a desired aesthetic appearance, such as the appearance of a wood grain, for example. The patterned coating can then be coated with a paint or stain to provide the final desired aesthetic appearance.

Formulating the primer composition of the present disclosure as an aerosol composition can provide a user with several of the advantages associated with the use of an aerosol. For example, it may be easier for some users to apply a more uniform coating of the primer composition of the present disclosure on a surface using an aerosol spray compared to applying the primer composition of the present disclosure as a liquid. In addition, applying the primer composition of the present disclosure as an aerosol may decrease the number of tools that a user needs to purchase and/or clean compared to a liquid formulation (e.g., brushes, rollers, trays, etc. . . . ).

The aerosol primer composition of the present disclosure can include a film forming component including (a) a polyurethane and/or alkyd, (b) cellulosic particles, and (c) an aqueous solvent system. The film forming component can also include one or more additives to provide a coating formed by the film forming component with the desired characteristics after application to the surface (e.g., one or more pigments). The aerosol primer composition also includes dimethyl ether as a propellant to aerosolize the film forming component. The aerosol primer formulation can be formulated as an aqueous formulation to decrease the use of volatile organic solvents. The film forming component can also include one or more additives that facilitate formation of an aerosol during dispensing of the primer composition of the present disclosure.

The film forming component of the aerosol primer composition can include one or more film forming resins, also referred to as binders. The film forming resin of the composition can facilitate binding the components of the film forming component together and provide adhesion of the composition to the substrate. The film forming resins of the present disclosure can include one or more polyurethanes, one or more alkyds, or a mixture of polyurethanes and alkyds. In one example, the film forming resin can be an aqueous polyurethane dispersion or aqueous alkyd dispersion. In some implementations, the aqueous dispersion may be free of organic solvents. One non-limiting example of a polyurethane film forming resin is Witcobond® 386-03, available from Chemtura Corporation. Witcobond® 386-03 is described by the manufacturer as a water-based, solvent free, anionic aliphatic polyurethane dispersion. Other examples of a polyurethane film forming resin according to the present disclosure include DAOTAN® VTW 6462/36WA and DAOTAN TW 6466/36WA, available from Allnex. Non-limiting examples of alkyds according to the present disclosure include water-based alkyds WorlèeSol E 150W and WorlèeSol E 330W, available from Worlèe Chemical Company.

The film forming resin (i.e., a polyurethane, an alkyd, or a combination thereof) can be present in an amount of from about 10% to about 20% by weight of the aerosol primer composition (wt %). In some examples, the film forming resin can be present in an amount of from about 10% to about 20%, about 10% to about 15%, or about 15% to about 20% by weight of the aerosol primer composition. For example, the film forming resin can be present in an amount of about 10%, about 11%, about 12%, about 13%, about 14%, about 15%, about 16%, about 17%, about 18%, about 19%, about 20% by weight of the aerosol primer composition, or any amount between these amount values.

The cellulosic particles can be selected to provide the coating formed by the aerosol primer composition with a surface that can be formed into a three-dimensional pattern. The cellulosic particles can also be selected to absorb a paint, wood stain, or masonry stain that is applied over the coating formed by the primer composition. The cellulosic particles can include wood particles, wood flour, sawdust, and/or nut shell particles. For example, the cellulosic particles can be in the form of a ground, filtered, powdered, flour, sawdust, and/or micronized wood or nut shell particles. Examples of suitable wood or nut shell particles can come from sources including walnut shell, walnut, oak, maple, mahogany, pine, spruce, *eucalyptus*, almond, almond shell, balsa, pecan, pecan shell, ash, other wood species, other nut shell material from the nut of any of these or other wood species, or combinations of wood and/or nut shell materials.

The cellulosic particles can have a particle diameter suitable for use with the components of the spray assembly used to dispense the primer composition as an aerosol. The cellulosic particles can also be selected to have a particle diameter that can be suspended within the film forming component and/or that provides the coating formed by the applied primer composition with a desired aesthetic appearance. According to one aspect, the particle diameter of the cellulosic particles can be defined based on a pore diameter of a filter used to filter the cellulosic particles. In some examples, the cellulosic particles can have a particle diameter that is a mixture of different diameters equal to or less than the pore diameter of the filter used to filter the cellulosic particles. For example, the cellulosic particles can have a particle diameter capable of passing through a filter pore having a pore diameter of from about 160 micrometers (μm) to about 220 μm. In some examples the cellulosic particles can have a particle diameter capable of passing through a filter pore having a pore diameter of from about 160 μm to about 220 μm, about 160 μm to about 210 μm, about 160 μm to about 200 μm, about 160 μm to about 190 μm, about 160 μm to about 180 μm, about 160 μm to about 170 μm, about 170 urn to about 220 μm, about 170 urn to about 210 μm, about 170 urn to about 200 μm, about 170 urn to about 190 μm, about 170 urn to about 180 μm, about 180 urn to about 220 μm, about 180 urn to about 210 μm, about 180 urn to about 200 μm, about 180 urn to about 190 μm, about 190 urn to about 220 μm, about 190 urn to about 210 μm, about 190 μm to about 200 μm, or about 200 μm to about 220 μm. In some examples the cellulosic particles can have a particle diameter capable of passing through a filter pore having a pore diameter of about 220 μm, about 210 μm, about 200 μm, about 190 μm, about 180 μm, about 170 μm, about 160 μm, or any pore diameter between these values.

The cellulosic particles can be present in an amount of from about 2% to about 5% by weight of the aerosol primer composition. In some examples, the cellulosic particles are present in an amount of from about 2% to about 5%, about 2%, about 2.25%, about 2.5%, about 2.75%, about 3%, about 3.25%, about 3.5%, about 3.75%, about 4%, about 4.25%, about 4.5%, about 4.75%, about 5% by weight of the aerosol primer composition, or any value between these values.

The aerosol primer composition can include an aqueous solvent system including water and optionally an additional solvent that is miscible with water. An example of a water miscible solvent is isopropyl alcohol. In some examples, the aerosol primer composition includes a solvent system that is a combination of water and isopropyl alcohol. Isopropyl alcohol may facilitate forming smaller droplet sizes in the aerosol spray compared to water alone. The aqueous solvent system can be present in an amount of from about 20% to about 40% by weight of the aerosol primer composition. In some examples, the aqueous solvent system is present in an amount of from about 20% to about 40%, about 20% to about 35%, about 20% to about 30%, about 20% to about 25%, about 25% to about 40%, about 25% to about 35%, about 25% to about 30%, about 30% to about 40%, about 30% to about 35%, or about 35% to about 40% by weight of the aerosol primer composition. For example, the aqueous solvent system can be present in an amount of about 20%, about 25%, about 30%, about 35%, or about 40% by weight of the aerosol primer composition, or any amount between these values.

The aerosol primer composition can include one or more additives to facilitate formation of the aerosol composition and/or to provide the coating formed by the aerosol primer composition with the desired characteristics. Examples of additives include rheology additives, dispersing agents, fillers, corrosion inhibitors, pigments, surfactants, defoamer, anti-foaming agents, and/or anti-settling agents.

According to some aspects, the aerosol primer composition can include one or more pigments to provide the coating formed by the aerosol primer composition with a desired color. In one example, the one or more pigments may provide the coating with an appearance similar to the color of wood, such as a dark wood color, a light wood color, or any shade in between. Different pigments, such as black, red, yellow, and white pigments, for example, can be combined in different ratios to provide the aerosol primer composition coating with the desired color. Examples of pigments include a white pigment (e.g., titanium dioxide), yellow oxide pigment, and red oxide pigment. In some examples, the aerosol primer composition can include one or more pigments from about 0.01% to about 6% by weight of the composition. For example, the pigment can be present from about 0.01% to about 6%, about 0.01% to about 5%, about 0.01% to about 4%, about 0.01% to about 3%, about 0.01% to about 2%, about 0.01% to about 1%, about 0.05% to about 6%, 0.05% to about 5%, about 0.05% to about 4%, about 0.05% to about 3%, about 0.05% to about 2%, about 0.05% to about 1%, about 0.1% to about 6%, 0.1% to about 5%, about 0.1% to about 4%, about 0.1% to about 3%, about 0.1% to about 2%, about 0.1% to about 1%, about 0.5% to about 6%, 0.5% to about 5%, about 0.5% to about 4%, about 0.5% to about 3%, about 0.5% to about 2%, about 0.5% to about 1%, about 1% to about 6%, 1% to about 5%, about 1% to about 4%, about 1% to about 3%, about 1% to about 2%, about 2% to about 6%, 2% to about 5%, about 2% to about 4%, about 2% to about 3%, about 3% to about 6%, 3% to about 5%, about 3% to about 4%, about 4% to about 6%, about 4% to about 5%, or about 5% to about 6% by weight of the aerosol primer composition. For example, the pigment can be present at about 0.01%, about 0.05%, about 0.1%, about 0.5%, about 1%, about 2%, about 3%, about 4%, about 5%, about 6% by weight of the aerosol primer composition, or any amount between these values.

In some aspects, the aerosol primer composition can include one or more rheology additives to facilitate formation of an aerosol spray, such as by modifying the composition consistency and/or viscosity of the film forming component. The rheology additive can be suitable for use in an aqueous system. In some examples, the aerosol primer composition includes a combination of two or more rheology additives. Examples of rheology additives include urea-modified rheology additives, urea-modified polyurethane rheology additives, silicone-based rheology additives, and polysiloxane polymer or co-polymer rheology additives. Examples of commercially available rheology additives that can be used in the present aerosol primer composition include BYK 301, BYK 420, BYK 425, BYK 1798, available from BYK-Chemie GmbH.

In some examples, the one or more rheology additives can be present in an amount of from about 0.05% to about 0.5% by weight of the aerosol primer composition. For example, the one or more rheology additives can be present in an amount of from about 0.05% to about 0.5%, about 0.05% to about 0.4%, about 0.05% to about 0.3%, about 0.05% to about 0.2%, about 0.05% to about 0.1%, about 0.1% to about 0.5%, 0.1% to about 0.4%, about 0.1% to about 0.3%, about 0.1% to about 0.2%, about 0.2% to about 0.5%, 0.2% to about 0.4%, about 0.2% to about 0.3%, about 0.3% to about 0.5%, 0.3% to about 0.4%, or about 0.4% to about 0.5% by weight of the composition. For example, the one or more rheology additives can be present in an amount of about 0.05%, about 0.1%, about 0.2%, about 0.3%, about 0.4%, about 0.5% by weight of the aerosol primer composition, or any amount between these values.

In some aspects, the aerosol primer composition can include one or more dispersing agents present in an amount of from about 0.3% to about 1%. The dispersing agent(s) may facilitate compatibility of a filler, when present, with the other parts of the film forming component. The dispersing agent(s) may also help to disperse the pigment in the film forming component. The dispersing agent may also improve the wetting characteristics of the aerosol primer composition. In one example, the dispersing agent can be a high molecular weight block co-polymer that optionally includes pendant groups with affinity for the pigments used in the aerosol primer composition (when present). An example of a commercially available dispersing agent is Disperbyk 190, available from BYK-Chemie GmbH. In some examples, the one or more dispersing agents can be present in an amount of from about 0.3% to about 1%, about 0.3% to about 0.9%, about 0.3% to about 0.8%, about 0.3% to about 0.7%, about 0.3% to about 0.6%, about 0.3% to about 0.5%, about 0.4% to about 0.9%, about 0.4% to about 0.8%, about 0.4% to about 0.7%, about 0.4% to about 0.6%, about 0.4% to about 0.5%, about 0.5% to about 0.9%, about 0.5% to about 0.8%, about 0.5% to about 0.7%, about 0.5% to about 0.6%, about 0.6% to about 0.9%, about 0.6% to about 0.8%, about 0.6% to about 0.7%, about 0.7% to about 0.9%, about 0.7% to about 0.8%, or about 0.8% to about 0.9% by weight of the aerosol primer composition. For example, the one or more dispersing agents can be present in an amount of about 0.3%, about 0.4%, about 0.5%, about 0.6%, about 0.7%, about 0.8%, about 0.9% of the aerosol primer composition, or any amount between these values.

According to some aspects, the aerosol primer composition can include one or more fillers present in an amount of from about 2% to about 5% by weight of the aerosol primer composition. In some examples, the filler is a mineral filler, an example of which includes Minex® 10 Nepheline Syenite, which is commercially available from Sibelco. The filler can help to extend the body of the film forming component and facilitate providing the film forming component with the consistency and viscosity suitable for dispensing as an aerosol spray. The filler can also facilitate suspending the pigments within the film forming component. In some examples, the one or more fillers can be present in an amount of from about 2% to about 5%, about 2% to about 4.5%, about 2% to about 4%, about 2% to about 3.5%, about 2% to about 3%, about 2.5% to about 5%, about 2.5% to about 4.5%, about 2.5% to about 4%, about 2.5% to about 3.5%, about 2.5% to about 3%, about 3% to about 5%, about 3% to about 4.5%, about 3% to about 4%, about 3% to about 3.5%, about 4% to about 4.5%, or about 4% to about 5% by weight of the aerosol primer composition. For example, the one or more fillers can be present in an amount of about 2%, about 2.5%, about 3%, about 3.5%, about 4%, about 4.5%, about 5% by weight of the aerosol primer composition, or any amount between these values.

In some aspects, the aerosol primer composition can also include one or more corrosion inhibitors present from about 0.05% to about 0.5% by weight of the aerosol primer composition. The aerosol primer composition can include a vapor phase corrosion inhibitor, a liquid phase corrosion inhibitor, or a combination of both. The type and amount of corrosion inhibitor may be based on the materials of the spray assembly that the aerosol primer composition comes into contact with and/or the components of the aerosol primer composition. In a typical aerosol spray assembly, a vapor may be present in the head space above the liquid composition, which may react with and possibly corrode exposed components of the spray assembly. In some examples, the corrosion inhibitor is configured to increase a pH of the film forming component and/or the vapor present within the container to inhibit corrosion. Examples of corrosion inhibitors include ammonium hydroxide, Raybo 60 (available from Raybo Chemical Company), and Advantex (available from Eastman Chemical Company). The one or more corrosion inhibitors can be present in an amount of from about 0.05% to about 0.5%, about 0.05% to about 0.4%, about 0.05% to about 0.3%, about 0.05% to about 0.2%, about 0.05% to about 0.1%, about 0.1% to about 0.5%, 0.1% to about 0.4%, about 0.1% to about 0.3%, about 0.1% to about 0.2%, about 0.2% to about 0.5%, 0.2% to about 0.4%, about 0.2% to about 0.3%, about 0.3% to about 0.5%, 0.3% to about 0.4%, or about 0.4% to about 0.5% by weight of the aerosol primer composition. For example, the one or more corrosion inhibitors can be present in an amount of about 0.05%, about 0.1%, about 0.2%, about 0.3%, about 0.4%, about 0.5% by weight of the aerosol primer composition, or any amount between these values.

In some aspects, the aerosol primer composition can include one or more surfactants and/or defoamers in an amount of from about 0.3% to about 2% by weigh of the aerosol primer composition. The surfactants and/or defoamers can help to minimize air entrapment and/or reduce a surface tension of the film forming component, which may minimize foaming during dispensing and facilitate a more uniform flow through the dispensing system. Surfactants can also act as a wetting agent in the film forming component. Examples of commercially available surfactants and defoamers include Surfonyl® AD01 and Surfynol® MD-20, available from Dow Chemical, and BYK 1798, available from BYK-Chemie GmbH. An example of a wetting agent is BYK 301, available from BYK-Chemie GmbH. In some examples, the one or more surfactants and/or defoamers can be present in an amount of from about 0.3% to about 2%, about 0.3% to about 1.5%, about 0.3% to about 1%, about 0.3% to about 0.5%, about 0.5% to about 2%, about 0.5% to about 1.5%, about 0.5% to about 1%, about 1% to about 2%, about 1% to about 1.5%, or about 1.5% to about 2% by weight of the aerosol primer composition. For example, the one or more surfactants and/or defoamers can be present in an amount of about 0.3%, about 0.5%, about 1%, about 1.5%, about 2% by weight of the aerosol primer composition, or any amount between these values.

According to some aspects, the aerosol primer composition can include one or more anti-settling agents (also referred to as agitators or suspending agents) to facilitate suspending and/or re-suspending the parts of the film forming component after storage. The anti-settling agents can help keep the pigment, cellulosic particles, and/or fillers in a soft settle during storage that is easier to re-mix prior to use and can improve stability of the aerosol primer composition during storage. An example of an anti-settling agent is Attagel® 50, from BASF, which is described by BASF as an attapulgite powder. The one or more anti-settling agents can be present in the aerosol primer composition at from about 0.5% to about 3% by weight of the aerosol primer composition. For example, the one or more anti-settling agents can be present at from about 0.5% to about 3%, about 0.5%, about 1%, about 1.5%, about 2%, about 2.5%, about 3% by weight of the aerosol primer composition, or any value between these values.

In some aspects, the film forming component can be characterized by a viscosity of from about 50 centipoise (cP) to about 150 cP. The viscosity of the film forming component can affect the ability of the primer composition to atomize during dispensing to form an aerosol spray. In some examples, the film forming component has a viscosity of from about 50 cP to about 150 cP, about 50 cP to about 125 cP, about 50 cP to about 100 cP, about 50 cP to about 75 cP, about 75 cP to about 150 cP, about 75 cP to about 125 cP, about 75 cP to about 100 cP, about 100 cP to about 150 cP, about 100 cP to about 125 cP, or about 125 cP to about 150 cP. The viscosity of the film forming component was measured using a Brookfield viscometer with spindle RV#2 at 20 rpm and 21° C.

The propellant component of the aerosol primer composition can include dimethyl ether (DME) and may optionally include one or more additional aqueous compatible propellants. The propellant can be present in the aerosol primer composition from about 30% to about 40% by weight of the primer composition. For example, the propellant can be present in the aerosol primer composition from about 30%, about 35%, or about 40% by weight of the aerosol primer composition, or any value between these values. In some aspects, the propellant component can be present in a ratio of film forming component:propellant component of about 60:40 to 70:30 by weight. For example, the propellant component can be present in a ratio of film forming component:propellant component of about 60:40, 65:35, 70:30 by weight, or any ratio between these ratio values.

Without being limited by any theory, for a conventional aerosol sprayable paint composition, a certain ratio of paint composition to propellant is required in order to provide acceptable atomization of the paint composition during dispensing. Atomization during dispensing can affect the characteristics of the aerosol spray, such as droplet size, droplet size uniformity, and coverage area. Small droplet size and droplet size uniformity generally provide an aerosol spray characteristic that is desirable for consumers, particularly for those consumers applying a finish to a piece of furniture or architectural component (e.g., a floor, wall, or trim component). However, as the concentration of propellant increases, the likelihood of phase separation of the components may also increase. As discussed above, phase separation can result in incomplete atomization of the product and/or coagulation of the product, which can decrease the product performance and in some cases can result in a product that is unable to be dispensed from an aerosol spray container (due to clogging of the dispensing system). The likelihood of phase separation can occur as a result of a shift in the solubility parameter of the liquid paint composition due to the addition of the liquefied propellant. The present disclosure provides a combination of polyurethane and/or alkyd film forming resins and cellulosic particles that is compatible with a propellant at ratios that can also produce acceptable atomization of the film forming component to produce an acceptable aerosol spray for forming a primer coating on a surface. According to some aspects of the present disclosure, the materials of the film forming component and the propellant are provided such that the film forming component and propellant are dispensed as a single liquid phase from an aerosol dispensing system.

Exemplary aerosol primer compositions according to the present disclosure are shown below in Table 1. Table 1 identifies the combination of materials and their respective amounts, in ranges, according to the present disclosure. The aerosol primer compositions in Table 1 may include additional components according to aspects of the present disclosure as described herein.

TABLE 1

Exemplary Aerosol Primer Compositions

| Component | Amount (by weight of the composition) |
| --- | --- |
| Polyurethane and/or alkyd | about 10% to about 20% |
| Cellulosic particles | about 2% to about 5% |
| Aqueous solvent system | about 20% to about 40% |
| Rheology additive | about 0.05% to about 0.5% |
| Dispersing agent | about 0.3% to about 1% |
| Corrosion inhibitor | about 0.05% to about 0.5% |
| Pigment | about 0.01% to about 6% |
| Dimethyl ether propellant | about 30% to about 40% |

Figure 2A:
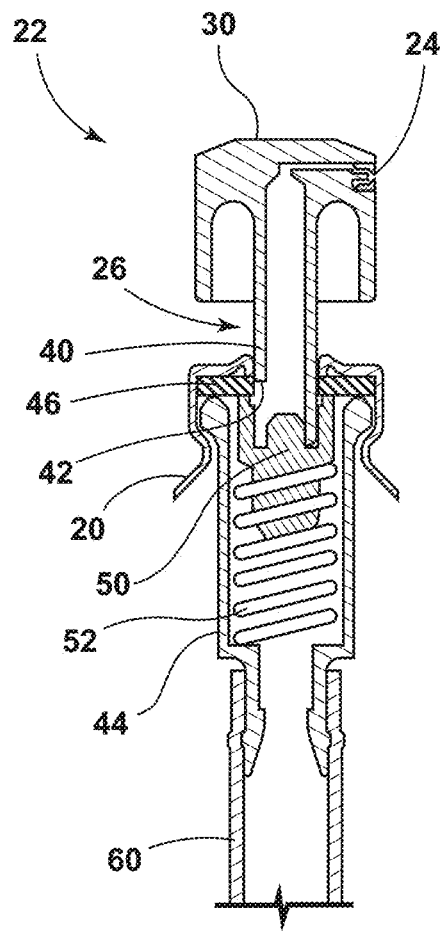
FIG. 2A is a cross-sectional view of a portion of the aerosol spray assembly of FIG. 1 with a valve assembly in a closed position, according to an aspect of the present disclosure.
Figure 2B:
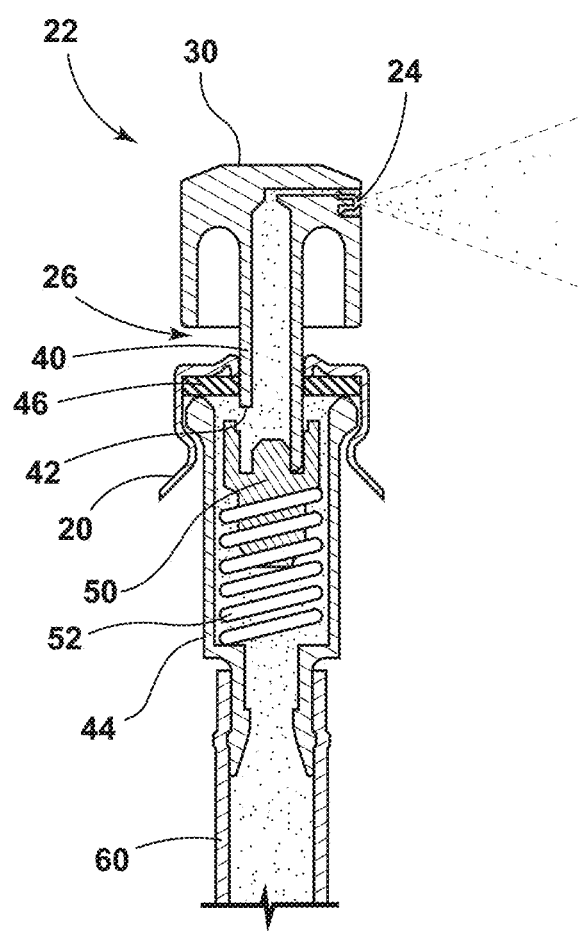
FIG. 2B is a cross-sectional view of a portion of the aerosol spray assembly of FIG. 1 with valve assembly in an actuated position, according to an aspect of the present disclosure.

FIGS. 1 and 2A-2B illustrate an exemplary spray assembly 10 that can be used with the aerosol primer compositions of the present disclosure. While aspects of the present disclosure are discussed in the context of the exemplary spray assembly 10, it is understood that the aerosol primer compositions of the present disclosure can be used in other configurations of aerosol spray assemblies.

The spray assembly 10 includes a container 12 at least partially defining a chamber 14 configured to hold the aerosol primer composition 16 at a pressure above ambient pressure. An open top of the container 12 can be sealed with a mounting cup 20 which is also sealed with a dispensing system 22.

Referring to FIGS. 2A-2B, the dispensing system 22 includes a dispensing spray outlet 24 that is fluidly coupled with a valve assembly 26 for selectively dispensing the aerosol primer composition 16 from the chamber 14. The dispensing system 22 can include an actuator 30 that is configured to selectively move the valve assembly 26 between closed (FIG. 2A) and open (FIG. 2B) positions to dispense the aerosol primer composition 16. The valve assembly 26 can include a valve stem 40 having a valve orifice 42 and a valve body 44 that is sealed with the mounting cup 20 by a gasket 46. The valve stem 40 is seated within a spring cup 50 that is coupled with a biasing member 52 (e.g., a spring) that biases the valve assembly 26 into the closed position of FIG. 2A. The valve body 44 can optionally be coupled with a dip tube 60 to fluidly couple the valve body 44 with the aerosol primer composition 16 stored in the chamber 14. According to one aspect of the present disclosure, the components of the dispensing system 22 can be selected to provide a desired amount of turbulence during dispensing to atomize the film forming component for application to a surface. The components of the spray assembly 10 can be selected to provide an aerosol spray having the desired characteristics, such as a desired spray pattern, spray rate, and/or droplet size, for example.

The container 12, mounting cup 20, and biasing member 52 can be made from any suitable metal material, such as tinplated steel or aluminum, for example, which may be coated or uncoated. Optionally, at least some of the metal material can include a protective coating to decrease the likelihood of the metal material interacting with one of the components of the aerosol primer composition 16. The components of the dispensing system 22, optionally including the biasing member 52, can be made from a polymeric material that is inert with respect to the components of the aerosol primer composition 16.

In use, to dispense the aerosol primer composition 16 as an aerosol spray, the container 12 can optionally be shaken or otherwise agitated to recombine any components of the aerosol primer composition 16 that may have settled during storage. The user can depress the actuator 30 which causes the valve stem 40 to move inward against the bias of the biasing of the element 52. When the valve stem 40 is moved sufficiently such that the valve orifice 42 passes the gasket 46 and is in fluid contact with the interior of the valve body 44, the aerosol primer composition 16 can flow from the valve body 44 through the valve orifice 42 into the valve stem 40 to the dispensing spray outlet 24 for dispensing as an aerosol.

The aerosol primer composition 16 is provided in the chamber 14 at a pressure greater than ambient pressure such that when the valve assembly 26 is opened, the propellant exerts pressure on the aerosol primer composition 16 to push the composition 16 through the dip tube 60 and the valve assembly 26 for spraying through the dispensing spray outlet 24. The propellant in the aerosol primer composition 16 is configured to push the aerosol primer composition 16 through the dispensing system 22 at a rate sufficient to generate a desirable aerosol spray. The propellant in the aerosol primer composition 16 is also configured to evaporate as the aerosol primer composition 16 is dispensed through the dispensing spray outlet 24 to atomize the film forming component of the aerosol primer composition 16 to form an aerosol or mist of droplets. The aerosol droplets applied on the surface form a coating that can then be painted or stained.

The spray assembly 10 can be used to spray the aerosol primer composition 16 as an aerosol onto a surface of a substrate to be painted and/or stained. The substrate can be a polymer, a glass, masonry, wood, a ceramic, stone, fiberglass, gypsum board, particle board, fiber board, or a metal. Exemplary substrates may be part of a furniture item (e.g., table top, dresser, bed frame, etc. . . . ) or an architectural component (e.g., wall, door, floor, decorative trim, patio, etc. . . . ). The aerosol primer composition 16 of the present disclosure can be sprayed onto the surface as an aerosol to form a coating on the surface that can be painted or stained (for example with a wood or concrete stain) to provide the surface with a desired aesthetic appearance. In some examples, after the coating of the primer composition is formed on the surface, a pattern can be formed in the coating to provide the coating with a desired 3-dimensional appearance. The patterned coating can then be painted or stained to obtain the desired color and/or finish appearance.

A pattern can be formed in the coating by dragging or pressing a tool, such as a brush, a rag, a roller, a comb, or a stamp, on the coating to create the desired pattern. In one example, the pattern may be configured to simulate wood grain such that the final aesthetic appearance of the substrate simulates the appearance and/or texture of wood, even when the substrate is made from a material other than wood. The cellulosic particles in the film forming component of the aerosol primer composition 16 can be configured to provide a 3-dimensional pattern when a tool is dragged or pressed on the coating and may also facilitate absorbing the paint or stain that is applied over the coating.

The following examples describe various features and advantages provided by the disclosure, and are in no way intended to limit the invention and appended claims.

EXAMPLES

Example 1

Table 2 below illustrates an exemplary aerosol primer composition ("Exemplary Composition 1") according to the present disclosure.

TABLE 2

Exemplary Composition 1.

| Component | Constituent | Amount (wt % by weight of the composition) |
|---|---|---|
| Polyurethane | Witcobond ® 386-03 | 16.57 |
| Rheology additive/Anti-settling agent | BYK 420 | 0.32 |
| Rheology additive | BYK 425 | 0.39 |

TABLE 2-continued

Exemplary Composition 1.

| Component | Constituent | Amount (wt % by weight of the composition) |
|---|---|---|
| Defoamer | BYK 1798 | 0.065 |
| Dispersing/Wetting agent | Disperbyk 190 | 0.65 |
| Filler | Minex ® 10 Nepheline Syenite | 3.9 |
| Cellulosic particles | Walnut Shell Powder | 3.25 |
| Anti-settling agent | Attagel ® 50 | 1.3 |
| Pigment | 90W1118 White (TiO$_2$)* | 1.43 |
| Pigment | 90Y1436 Yellow Oxide* | 1.10 |
| Pigment | 90R1643 Red Oxide* | 1.0 |
| Pigment | 90K1345 Black 7* | 0.02 |
| Surfactant | Surfonyl ® AD01 | 1.04 |
| Defoamer | Surfynol ® MD-20 | 0.52 |
| Wetting agent | BYK 301 | 0.06 |
| Corrosion inhibitor | Raybo 60 | 0.13 |
| Corrosion inhibitor | Advantex | 0.195 |
| Co-solvent | Isopropanol | 9.1 |
| Solvent | Water | 23.94 |
| Propellant | Dimethyl ether (DME) | 35.0 |

*from Pantek, Inc.

The components of Exemplary Composition 1 can be prepared as follows to form a composition that can be dispensed as an aerosol from a spray assembly. The film forming component of Exemplary Composition 1 can be made as follows: Witcobond® 386-03 (polyurethane dispersion) is combined in a clean and dry mixing tank with a portion of the water (about 9.4 wt %) and the shear mixer is started and allowed to run at low speed for about 5 minutes. A first portion of isopropyl alcohol (about 3.25 wt %) is added under agitation and mixed at low speed for another 5 minutes. BYK 420 is added and the mixer speed is slowly increased while adding BYK 425. The material is then mixed at high speed for 15 minutes. The following components are then added and mixed for another 15 minutes: Disperbyk 190, BYK 1798, BYK 301, Surfonyl® AD01 and Surfynol® MD-20. The walnut shell powder is then added and mixed at high speed for 10 minutes, followed by the addition of Minex® 10 Nepheline Syenite and Attagel® 50, with mixing for an additional 10 minutes. Up to about 2 wt % water can be used to rinse the walnut shell powder down the sides of the mixing tank. A portion of the pigments (90W1118 White, 90Y1436 Yellow Oxide, 90R1643 Red Oxide, and 90K1345 Black 7) can be added. About 10 wt % of the 90R1643 Red Oxide and about 20 wt % of the 90Y1436 Yellow Oxide can be withheld for tinting. The balance of water, Raybo 60, and Advantex can be added along with slow addition of isopropyl alcohol, at a reduced speed to avoid splashing, and mixed for another 10 minutes. The withheld pigments can be added to the mixed film forming component to provide the desired tint.

The thus formed film forming component has a light brown color, a specific gravity of about 1.05-1.07, a pH of 8.5-9.5, and a viscosity of 50-150 cP. The film forming component can then be added into a spray assembly and the DME propellant can be added to pressurize the composition within the spray assembly at a pressure above ambient pressure.

Upon addition of the DME propellant to the film forming component, the mixture was visually inspected. No visual phase separation or formation of coagulates was observed.

Comparative Example 1

Table 3 below illustrates a comparative primer formulation ("Comparative Composition 1") which did not form a composition suitable for dispensing as an aerosol. The liquid wood primer is a commercially available product, Stainable Primer™, from Advanced Wood Paint, LLP, which is described by the manufacturer as a waterborne stainable liquid primer including 45.4 wt % latex, 18.2 wt % titanium dioxide, and 20 wt % silica, and wood powder.

TABLE 3

Comparative Composition 1.

| Component | Amount wt % (by weight of the composition) |
|---|---|
| Liquid wood primer | 29.75 |
| Water | 50.74 |
| Sodium Nitrite | 0.085 |
| Sodium Silicate Penta Hydrate | 0.085 |
| Morpholine | 0.085 |
| Dimethyl Carbonate | 4.25 |
| Dimethyl Ether (DME) | 15.0 |

The components of Comparative Composition 1 were combined in a spray assembly and pressurized by the addition of the DME propellant. The sodium nitrite and morpholine were added as corrosion inhibitors and the sodium silicate pentahydrate was added as a buffering agent. Dimethyl carbonate was added as a co-solvent with the water. The composition (without the DME propellant) has a light brown color, a specific gravity of 1.352, and a pH of 9.4.

Upon addition of the DME propellant to the mixture of the other components, the mixture was visually inspected. Phase separation of the DME propellant was seen, indicating that the Comparative Composition 1 was not suitable for dispensing as an aerosol spray.

Exemplary Composition 1 illustrates that the aerosol primer composition of the present disclosure can provide a film forming component that is compatible with a propellant (as indicated by the lack of phase separation) at sufficient ratios to allow for the primer composition to be dispensed as an aerosol. Even at a lower propellant concentration compared to the Exemplary Composition 1, the Comparative Composition 1 exhibited phase separation of the film forming component and the propellant.

Without being limited by any theory, it is believed that acrylic film forming resins, such as Aquamac® 720 (available from Polynt Composites USA) or SYCOAT 2020 (available from STI Polymer), are incompatible with the propellant and cellulosic particles of the present aerosol primer composition and thus are not capable of forming a primer composition with cellulosic particles that can be dispensed as an aerosol. When these types of acrylic film forming resins are combined with cellulosic particles to form a film forming component that is then combined with a propellant, phase separation, and in some cases coagulation, of the mixture is observed, indicating that the components are not compatible. In contrast, the primer composition of the present disclosure including a combination of a polyurethane and/or alkyd and cellulosic particles can be combined with a propellant to form an aerosol primer composition that can be dispensed onto a surface as an aerosol spray.

The following non-limiting aspects are encompassed by the present disclosure. To the extent not already described, any one of the features of the following aspects may be combined in part or in whole with features of any one or more of the other aspects of the present disclosure to form additional aspects, even if such a combination is not explicitly described.

According to a first aspect of the present disclosure, an aerosol primer composition includes a film forming component including (by weight of the composition): (a) at least one of a polyurethane and alkyd from about 10% to about 20%, (b) cellulosic particles from about 2% to about 5%, and (c) an aqueous solvent system from about 20% to about 40%; and a propellant component including dimethyl ether.

According to the first aspect of the present disclosure, a ratio of an amount of the film forming component to an amount of the propellant component is from about 60:40 to about 70:30 (by weight).

According to the first aspect or any intervening aspects of the present disclosure, the cellulosic particles include at least one of wood particles, wood flour, sawdust, and nut shell particles.

According to the first aspect or any intervening aspects of the present disclosure, the cellulosic particles include a particle diameter capable of passing through a filter pore having a pore diameter of about 160 micrometers to about 220 micrometers.

According to the first aspect or any intervening aspects of the present disclosure, the film forming component further includes at least one component selected from (by weight of the composition): a rheology additive from about 0.05% to about 0.5%, a dispersing agent from about 0.3% to about 1%, a mineral filler from about 2% to about 5%, a corrosion inhibitor from about 0.05% to about 0.5%, and a pigment from about 0.01% to about 6%.

According to the first aspect or any intervening aspects of the present disclosure, the aqueous solvent system includes water or a combination of water and isopropyl alcohol.

According to the first aspect or any intervening aspects of the present disclosure, the film forming component includes a viscosity of about 50 centipoise to about 150 centipoise.

According to the first aspect or any intervening aspects of the present disclosure, the at least one of a polyurethane and alkyd is a polyurethane, and further wherein the aqueous solvent system includes water and isopropyl alcohol.

According to the first aspect or any intervening aspects of the present disclosure, the film forming component consists essentially of (by weight of the composition): (a) a polyurethane from about 10% to about 20%, (b) cellulosic particles from about 2% to about 5%, (c) an aqueous solvent system consisting of water and isopropyl alcohol from about 20% to about 40%, and (d) at least one component selected from: a rheology additive from about 0.05% to about 0.5%, a dispersing agent from about 0.3% to about 1%, a mineral filler from about 2% to about 5%, a corrosion inhibitor from about 0.05% to about 0.5%, and a pigment from about 0.01% to about 6%.

According to a second aspect of the present disclosure, a method of priming a substrate to be painted or stained includes: dispensing a primer composition onto a surface of the substrate from a pressurized container, wherein the primer composition includes: a film forming component including (by weight of the composition): (a) at least one of a polyurethane and alkyd from about 10% to about 20%, (b) cellulosic particles from about 2% to about 5%, and (c) an aqueous solvent system from about 20% to about 40%; and a propellant component including dimethyl ether. Wherein the dispensing is conducted such that the propellant evaporates as the primer composition is dispensed from the pressurized container and the film forming component defines a coating on the surface of the substrate.

According to the second aspect of the present disclosure, the substrate includes one of a polymer, glass, masonry, wood, ceramic, stone, fiberglass, gypsum board, particle board, fiber board, and metal.

According to the second aspect or any intervening aspects of the present disclosure, the method further includes: forming a pattern in the coating including the film forming component.

According to the second aspect or any intervening aspects of the present disclosure, the forming a pattern in the coating is conducted by at least one of dragging and pressing one of a brush, rag, roller, comb, and stamp on the coating.

According to the second aspect or any intervening aspects of the present disclosure, the method further includes: applying one of a paint, wood stain, and masonry stain on the coating.

According to the second aspect or any intervening aspects of the present disclosure, the cellulosic particles include at least one of wood particles, wood flour, sawdust, and nut shell particles.

According to the second aspect or any intervening aspects of the present disclosure, wherein the film forming component further includes at least one component selected from (by weight of the composition): a rheology additive from about 0.05% to about 0.5%, a dispersing agent from about 0.3% to about 1%, a mineral filler from about 2% to about 5%, a corrosion inhibitor from about 0.05% to about 0.5%, and a pigment from about 0.01% to about 6%.

According to a third aspect of the present disclosure, a spray assembly for an aerosol primer composition includes: a container defining a chamber configured to hold an aerosol primer composition at a pressure above ambient pressure; a dispensing spray outlet fluidly coupled with the chamber for dispensing the aerosol primer composition from the chamber; and an aerosol primer composition including: a film forming component including (by weight of the composition): (a) at least one of a polyurethane and alkyd from about 10% to about 20%, (b) cellulosic particles from about 2% to about 5%, and (c) an aqueous solvent system from about 20% to about 40%; and a propellant component including dimethyl ether, wherein the propellant component includes a propellant selected to pressurize the film forming component within the chamber.

According to the third aspect the present disclosure, a ratio of an amount of the film forming component to an amount of the propellant component is from about 60:40 to about 70:30 (by weight).

According to the third aspect or any intervening aspects of the present disclosure, the cellulosic particles comprise at least one of wood particles, wood flour, sawdust, and nut shell particles.

According to the third aspect or any intervening aspects of the present disclosure, the cellulosic particles comprise a particle diameter capable of passing through a filter pore having a pore diameter of about 160 micrometers to about 220 micrometers.

According to the third aspect or any intervening aspects of the present disclosure, the film forming component further includes at least one component selected from (by weight of the composition): a rheology additive from about 0.05% to about 0.5%, a dispersing agent from about 0.3% to about 1%, a mineral filler from about 2% to about 5%, a corrosion inhibitor from about 0.05% to about 0.5%, and a pigment from about 0.01% to about 6%.

According to the third aspect or any intervening aspects of the present disclosure, the aqueous solvent system includes water or a combination of water and isopropyl alcohol.

According to the third aspect or any intervening aspects of the present disclosure, the film forming component includes a viscosity of about 50 centipoise to about 150 centipoise.

It is also to be understood that variations and modifications can be made on the aforementioned structures, compositions, and methods without departing from the concepts of the present disclosure, and further, it is to be understood that such concepts are intended to be covered by the following claims, unless these claims, by their language, expressly state otherwise.

What is claimed is:

1. An aerosol primer composition, comprising:
    a film forming component comprising (by weight of the composition):
        (a) at least one of a polyurethane and alkyd from about 10% to about 20%,
        (b) cellulosic particles from about 2% to about 5%, and
        (c) an aqueous solvent system from about 20% to about 40%; and
    a propellant component comprising dimethyl ether.

2. The aerosol primer composition of claim 1, wherein a ratio of an amount of the film forming component to an amount of the propellant component is from about 60:40 to about 70:30 (by weight).

3. The aerosol primer composition of claim 1, wherein the cellulosic particles comprise at least one of wood particles, wood flour, sawdust, and nut shell particles.

4. The aerosol primer composition of claim 1, wherein the cellulosic particles comprise a particle diameter capable of passing through a filter pore having a pore diameter of about 160 micrometers to about 220 micrometers.

5. The aerosol primer composition of claim 1, wherein the film forming component further comprises at least one component selected from (by weight of the composition):
    a rheology additive from about 0.05% to about 0.5%,
    a dispersing agent from about 0.3% to about 1%,
    a mineral filler from about 2% to about 5%,
    a corrosion inhibitor from about 0.05% to about 0.5%, and
    a pigment from about 0.01% to about 6%.

6. The aerosol primer composition of claim 1, wherein the aqueous solvent system comprises water or a combination of water and isopropyl alcohol.

7. The aerosol primer composition of claim 1, wherein the film forming component comprises a viscosity of about 50 centipoise to about 150 centipoise.

8. The aerosol primer composition of claim 1, wherein the at least one of a polyurethane and alkyd is a polyurethane, and further wherein the aqueous solvent system comprises water and isopropyl alcohol.

9. The aerosol primer composition of claim 1, wherein the film forming component consists essentially of (by weight of the composition):
    (a) a polyurethane from about 10% to about 20%,
    (b) cellulosic particles from about 2% to about 5%,
    (c) an aqueous solvent system consisting of water and isopropyl alcohol from about 20% to about 40%, and
    (d) at least one component selected from:
        a rheology additive from about 0.05% to about 0.5%,
        a dispersing agent from about 0.3% to about 1%,
        a mineral filler from about 2% to about 5%,
        a corrosion inhibitor from about 0.05% to about 0.5%, and
        a pigment from about 0.01% to about 6%.

10. A method of priming a substrate to be painted or stained, comprising:
    dispensing a primer composition onto a surface of the substrate from a pressurized container, wherein the primer composition comprises:
        a film forming component comprising (by weight of the composition):
            (a) at least one of a polyurethane and alkyd from about 10% to about 20%,
            (b) cellulosic particles from about 2% to about 5%, and
            (c) an aqueous solvent system from about 20% to about 40%; and
        a propellant component comprising dimethyl ether,
    wherein the dispensing is conducted such that the propellant evaporates as the primer composition is dispensed from the pressurized container and the film forming component defines a coating on the surface of the substrate.

11. The method of claim 10, wherein the substrate comprises one of a polymer, glass, masonry, wood, ceramic, stone, fiberglass, gypsum board, particle board, fiber board, and metal.

12. The method of claim 10, further comprising:
    forming a pattern in the coating comprising the film forming component.

13. The method of claim 10, further comprising:
    applying one of a paint, wood stain, and masonry stain on the coating.

14. The method of claim 10, wherein the cellulosic particles comprise at least one of wood particles, wood flour, sawdust, and nut shell particles.

15. The method of claim 10, wherein the film forming component further comprises at least one component selected from (by weight of the composition):
    a rheology additive from about 0.05% to about 0.5%,
    a dispersing agent from about 0.3% to about 1%,
    a mineral filler from about 2% to about 5%,
    a corrosion inhibitor from about 0.05% to about 0.5%, and
    a pigment from about 0.01% to about 6%.

16. A spray assembly for an aerosol primer composition, comprising:
    a container defining a chamber configured to hold an aerosol primer composition at a pressure above ambient pressure;
    a dispensing spray outlet fluidly coupled with the chamber for dispensing the aerosol primer composition from the chamber; and
    an aerosol primer composition comprising:
        a film forming component comprising (by weight of the composition):
            (a) at least one of a polyurethane and alkyd from about 10% to about 20%,
            (b) cellulosic particles from about 2% to about 5%, and
            (c) an aqueous solvent system from about 20% to about 40%; and
        a propellant component comprising dimethyl ether,
    wherein the propellant component comprises a propellant selected to pressurize the film forming component within the chamber.

17. The spray assembly of claim 16, wherein a ratio of an amount of the film forming component to an amount of the propellant component is from about 60:40 to about 70:30 (by weight).

18. The spray assembly of claim 16, wherein the cellulosic particles comprise at least one of wood particles, wood flour, sawdust, and nut shell particles.

19. The spray assembly of claim 16, wherein the cellulosic particles comprise a particle diameter capable of passing through a filter pore having a pore diameter of about 160 micrometers to about 220 micrometers.

20. The spray assembly of claim 16, wherein the film forming component comprises a viscosity of about 50 centipoise to about 150 centipoise.

* * * * *